A. B. FERGUSON.
SPRING SUSPENSION.
APPLICATION FILED APR. 13, 1914.

1,127,608.

Patented Feb. 9, 1915.
2 SHEETS—SHEET 1.

Witnesses
Harold Scantlebury
Ansley Strom

Inventor
Archibald Bruce Ferguson

By Herbert E. Smith
Attorney

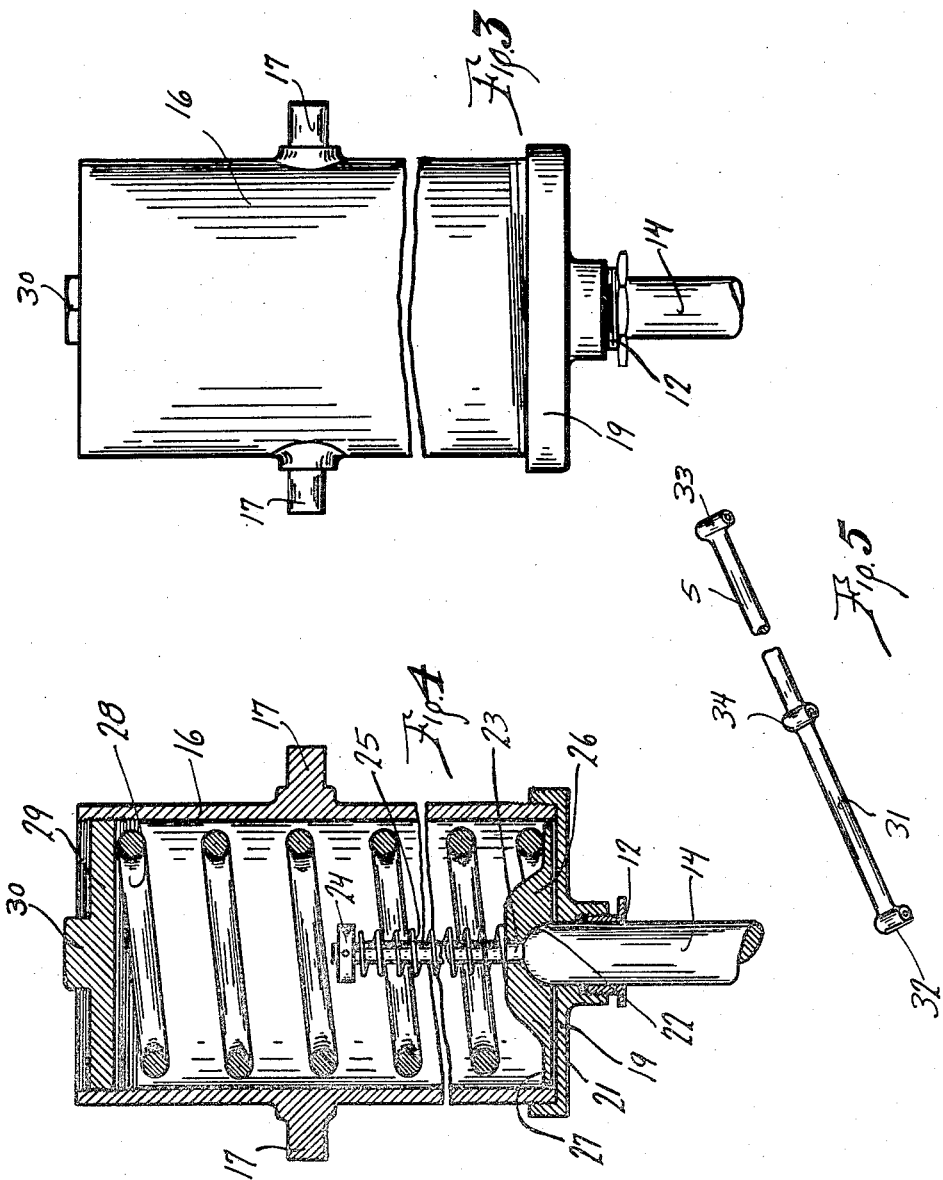

UNITED STATES PATENT OFFICE.

ARCHIBALD BRUCE FERGUSON, OF SPOKANE, WASHINGTON.

SPRING SUSPENSION.

1,127,608.   Specification of Letters Patent.   Patented Feb. 9, 1915.

Application filed April 13, 1914. Serial No. 831,561.

*To all whom it may concern:*

Be it known that I, ARCHIBALD BRUCE FERGUSON, a citizen of the United States, residing at Spokane, in the county of Spokane and State of Washington, have invented new and useful Improvements in Spring Suspension, of which the following is a specification.

This invention relates to improvements in spring suspension means for vehicles, and is especially adapted for use in connection with automobiles.

The invention has to do more particularly with an improved coil or spiral spring suspension means in contradistinction to the elliptical type of spring suspension.

It is one of the objects of this invention to incorporate in the spring suspension means, a shock absorber which will neutralize recoil and rebound when traversing rough roads or riding obstacles.

A further object of the invention is to provide duplicate suspension devices on opposite sides of the longitudinal axis of the vehicle, both at front and rear, so as to gain the utmost resiliency and independent side flexibility allowing for a maximum freedom of tilt of the axles with a minimum corresponding movement of the chassis and body.

Other features and objects of the invention will be more fully described in connection with the accompanying drawings, and will be more particularly pointed out in and by the appended claims.

Figure 1:
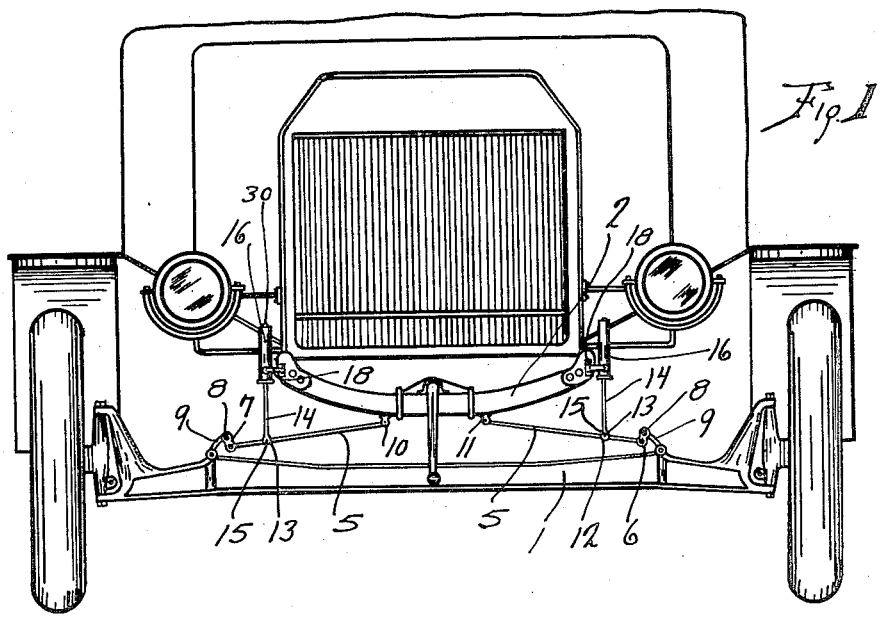
Figure 2:
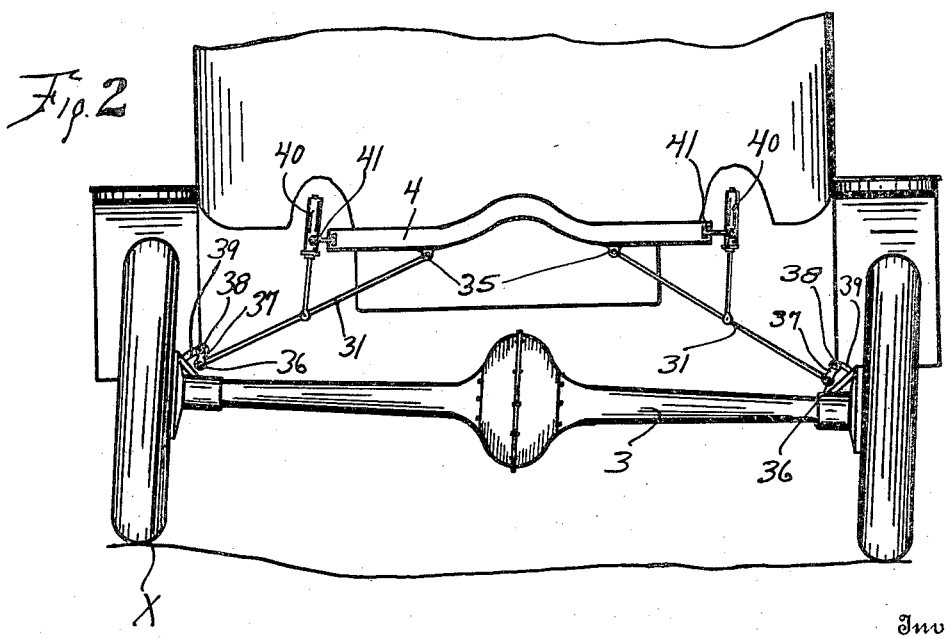

In the drawings:—Figure 1 is a view in front elevation of an automobile, illustrating the application thereto of one form of my invention. Fig. 2 is a rear end elevation. Fig. 3 is a view in elevation of one of my improved spring holders. Fig. 4 is a vertical sectional view thereof. Fig. 5 is a perspective view of one of my improved suspension members.

Like characters of reference designate similar parts throughout the different figures of the drawings.

In the accompanying illustration, I have shown the device of my invention applied to the Ford type of automobile, but it will be understood that its utility is not confined to any particular make of vehicle.

As shown, 1 designates the front axle and 2 a front member of the frame or chassis which is disposed above and parallel with the axle 1. The rear axle designated at 3 and a corresponding rear member of the frame or chassis is designated at 4.

First referring to the structure at the front end of the machine, 5 designates suspension members which are preferably in the form of rods, as indicated more fully in Fig. 5. The outer ends of the suspension rods 5 are pivotally connected at 6, to links 7. The links 7 are pivoted at 8 to brackets 9, which may be formed integral with or rigidly secured to the axle 1 as shown in Fig. 1. The inner ends of the suspension members 5 are pivoted at 10 to brackets 11, which latter are rigidly secured to the frame 2.

It will be seen from the foregoing that the suspension members 5 are disposed on opposite sides of the longitudinal axis of the vehicle and that said members swing on pivotal axes parallel with the longitudinal axis of the vehicle and substantially at right angles to the front axle. At least one pivotal connection, which in the present construction is at 6, is a swinging, as well as a pivotal connection, thereby providing for limited relative movement of the suspension rods and front axle in the direction of their length. This feature greatly adds to the advantages, and materially relieves transmission to the frame of lateral stresses to which it would otherwise be subjected by tilting movement of the axles, as more particularly illustrated in Fig. 2, where the rear axle is canted by the obstruction X.

Between the ends of the suspension members 5, I provide the same with bosses 12 to which the lower bifurcated or forked ends 13 of supporting members 14 are pivotally connected, as indicated at 15. The pivotal connections 15 are likewise disposed so that their axes are parallel with the longitudinal axis of the vehicle.

I provide spring holders, which are shown in the form of cylinders 16, more particularly illustrated in Fig. 4. The cylinders 16 are shown provided with trunnions 17 adapted to be mounted or journaled in bearing brackets 18, rigidly connected with the front frame member 2. The pivotal axes of the holders or cylinders 16 are also disposed parallel with the longitudinal axis of the vehicle. The lower ends of the cylinders 16 are closed by heads 19, which may be threaded on the cylinders and which may be provided with packing glands 12 in which the supporting rods 14 are slidably mounted. Within the cylinders 16, I mount plunger pistons 21, which fit relatively closely therein. The supporting rods 14 are rounded at 22, and I correspondingly socket the plungers 21 to fit the rounded ends 22. The supporting members 14 are reduced to form shanks 23, which extend through the plungers 21 and which are provided with collars 24, pinned thereon, at their upper ends. Between the collars 24 and plungers 21, I interpose a shock absorbing spring 25, which functions to limit outward or downward movement of the rod 14 at a rate exceeding the rate of speed permitted to the plunger 21 under the dash pot action which results from the relatively close fit of the plunger in the piston. This action is enhanced by reason of the fact that the spring holders will contain a considerable quantity of lubricant, which must be forced from under the plunger when the latter descends.

It will be noted that the stock of the plunger 21, at 26, is increased in thickness with respect to the outer margin 27 so as to provide for socketing the rounded end 22 and reduce wear. Furthermore, the reduction toward the periphery serves as a guide for the suspension spring to hold the same in place.

In Fig. 4, I have shown a suspension spring of the coiled type, as indicated at 28, and the lower end thereof rests upon the reduced margin 27 of the plunger 21. The upper end of the cylinder 16 is internally threaded to receive an adjustable head 29 between which and the plunger 21, the spring 28 is interposed. The head 29 is provided with a projection 30, whereby the head may be adjusted to vary the tension of the spring 28. Likewise, the head 29 may be removed to permit of a supply of lubricant or to renew springs.

The suspension devices at front and rear are identical in construction and operation excepting that the suspension members 31 are slightly longer than the suspension members 5. By reference to Fig. 5, it will be seen that the suspension members 31 are hubbed at their ends, as indicated at 32 and 33, and intermediate of their ends, as indicated at 34. The inner ends are pivoted at 35 to the rear frame member 4 and the outer ends are pivoted at 36 to links 37, which latter are pivoted at 38 to brackets 39. The rear holders or cylinders 40 are pivoted to brackets 41 which are mounted upon the rear frame members 4.

It will now be seen that the spring holders may swing to accommodate any relative longitudinal movement of the suspension members with respect to their axles in a manner so that the supporting rods 14 will always take their load in the direction of their length and likewise the suspension springs will never be subjected to torsional stresses at angles to their longitudinal axes. Referring more particularly to Fig. 2, it will be seen that the two cylinders will accommodate themselves readily to the different angles of stress, which results from tilting of the rear axle.

It is believed that the advantages and novelty of my invention will be fully understood from the foregoing description, and while I have herein shown and described one specific form of my invention, I do not wish to be limited thereto except for such limitations as the claims may import.

I claim:—

1. In a vehicle spring suspension means, an axle, a frame portion parallel therewith, suspension members pivoted to the axle and frame portion at points opposite the longitudinal axis of the vehicle to swing and move on axes parallel with said axis, spring holders pivoted to the frame portion to swing about axes parallel with said axis, springs in said holders, and supporting members pivoted to said suspension members and coacting with said springs to support the frame portion, substantially as described.

2. In a vehicle spring suspension means, an axle, a frame portion, suspension rods pivoted to the axle and frame portion with the axes of said pivots parallel with the longitudinal axis of the vehicle, spring holders pivoted to the frame portion to swing on axes parallel with said axis, and suspension spring means coacting with said holders and members to support the frame portion, substantially as described.

3. In a vehicle spring suspension means, an axle, a frame, suspension rods pivoted to the axle and frame, spring suspension devices each comprising a cylinder pivoted to the frame, a suspension spring in the cylinder, a plunger in the cylinder acting upon said spring, and a supporting member pivoted to its suspension rod and coacting with said plunger, substantially as described.

4. In a vehicle spring suspension means, an axle, a frame, suspension rods pivoted to the axle and frame, a spring suspension device for each rod, each device comprising a hollow spring holder, a suspension spring therein, a plunger in the holder acting upon said spring, a supporting member pivoted to its suspension rod and having strut engagement and being slidably connected with said plunger, and a recoil spring coacting with said supporting member and plunger to resist sliding movement thereof with respect to each other, substantially as described.

5. In a vehicle spring suspension means, an axle, a frame, suspension rods pivoted to the axle and frame, a dash pot spring suspension device for each rod, each comprising a cylinder pivoted to the frame, a plunger having a close fit in the cylinder, an adjustable head for the cylinder, a suspension spring in the cylinder interposed between the plunger and said adjustable head, a supporting rod pivoted to its suspension rod and having strut engagement with said plunger for movement of both together in one direction and slidably connected with the plunger for independent movement with respect thereto in another direction, and a shock absorbing spring resisting independent movement of the supporting rod with respect to the plunger under dash pot action of the latter, substantially as described.

In testimony that I claim the foregoing as my own, I hereby affix my signature in the presence of two subscribing witnesses.

ARCHIBALD BRUCE FERGUSON.

Witnesses:
HAROLD SCANTLEBURY,
ANSLEY STROM.